US012131636B2

(12) United States Patent
Moyer

(10) Patent No.: US 12,131,636 B2
(45) Date of Patent: Oct. 29, 2024

(54) LED TRAFFIC LIGHT SYSTEM

(71) Applicant: Christopher S. Moyer, Louisville, KY (US)

(72) Inventor: Christopher S. Moyer, Louisville, KY (US)

( * ) Notice: Subject to any disclaimer, the term of this patent is extended or adjusted under 35 U.S.C. 154(b) by 21 days.

(21) Appl. No.: 18/131,497

(22) Filed: Apr. 6, 2023

(65) Prior Publication Data

US 2024/0203251 A1 Jun. 20, 2024

Related U.S. Application Data

(60) Provisional application No. 63/476,005, filed on Dec. 19, 2022.

(51) Int. Cl.

| | |
|---|---|
| ***G08G 1/095*** | (2006.01) |
| ***F21S 8/00*** | (2006.01) |
| *F21W 111/02* | (2006.01) |
| *F21Y 115/10* | (2016.01) |

(52) U.S. Cl.
CPC ................ *G08G 1/095* (2013.01); *F21S 8/00* (2013.01); *F21W 2111/02* (2013.01); *F21Y 2115/10* (2016.08)

(58) Field of Classification Search
CPC ......... G08G 1/095; F21S 8/00; F21S 2115/10
See application file for complete search history.

(56) References Cited

U.S. PATENT DOCUMENTS

| | | | | |
|---|---|---|---|---|
| 4,167,001 | A | 9/1979 | Gilmore | |
| 4,839,647 | A | 6/1989 | Patterson | |
| 5,563,588 | A | 10/1996 | Belfer | |
| 5,619,194 | A | 4/1997 | Belfer | |
| 5,898,381 | A | 4/1999 | Gartner et al. | |
| 6,054,932 | A | 4/2000 | Gartner et al. | |
| 6,072,407 | A | 6/2000 | Shin | |
| 6,762,689 | B2 | 7/2004 | Dechape | |
| 6,809,655 | B1 | 10/2004 | Colby | |
| 7,006,011 | B1 | 2/2006 | Colby | |
| 7,180,252 | B2 | 2/2007 | Lys et al. | |
| 7,330,130 | B2 * | 2/2008 | Bolotin | G08G 1/096 340/925 |
| 7,573,401 | B2 | 8/2009 | Wabeke | |
| 7,764,195 | B2 | 7/2010 | Glover | |
| 7,808,402 | B1 | 10/2010 | Colby | |
| 7,859,430 | B2 | 12/2010 | Ochiai | |
| 8,154,423 | B2 | 4/2012 | Wiseman | |
| 9,153,128 | B2 | 10/2015 | Holzwanger et al. | |
| 9,488,354 | B2 * | 11/2016 | McClean | F21V 23/0464 |
| 9,715,827 | B2 * | 7/2017 | Ng | G08G 1/0175 |
| 10,242,567 | B2 | 3/2019 | Li et al. | |
| 10,403,142 | B1 | 9/2019 | Shuff | |
| 10,650,672 | B2 | 5/2020 | Shuff | |

(Continued)

*Primary Examiner* — John A Tweel, Jr.
(74) *Attorney, Agent, or Firm* — Dentons Bingham Greenebaum LLP; Brian W. Chellgren; James C. Eaves, Jr.

(57) ABSTRACT

A LED Traffic Light to aid people who have issues with color blindness. For the main LED traffic light, there is a solid matrix of LEDs on the complete face facing traffic. The light pattern displayed will indicate red, yellow, or green and the light patterns shown will differ for red, yellow, and green. Auxiliary lights can be employed with the main LED traffic light to indicate whether or not turns can be made.

7 Claims, 3 Drawing Sheets

(56) References Cited

U.S. PATENT DOCUMENTS

| | | | |
|---|---|---|---|
| 11,615,704 | B2 * | 3/2023 | Kijashka ............ G09F 13/0472 340/929 |
| 2003/0137428 | A1 | 7/2003 | Hutchison |
| 2003/0137432 | A1 | 7/2003 | Wiseman |
| 2003/0156044 | A1 | 8/2003 | Wiseman |
| 2008/0258933 | A1 | 10/2008 | Diba |
| 2009/0267794 | A1 | 10/2009 | Chang et al. |
| 2010/0225502 | A1 | 9/2010 | Elsheemy |
| 2010/0315264 | A1 | 12/2010 | Tarolli |
| 2016/0005311 | A1 | 1/2016 | Holzwanger et al. |
| 2017/0103650 | A1 | 4/2017 | Amadon |

* cited by examiner

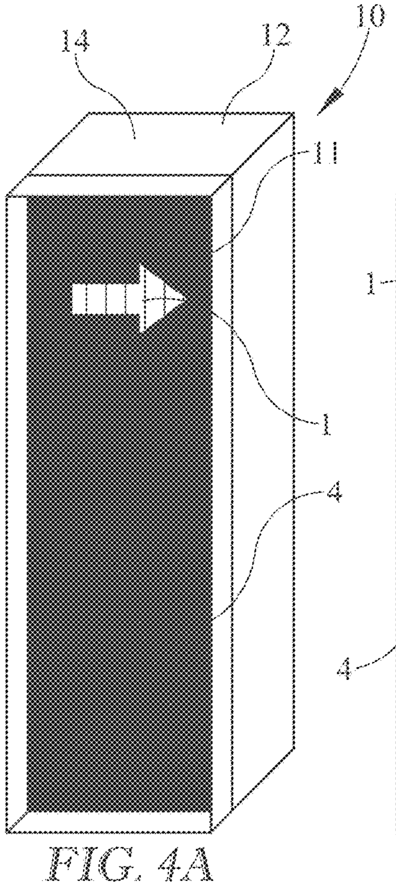
FIG. 4A
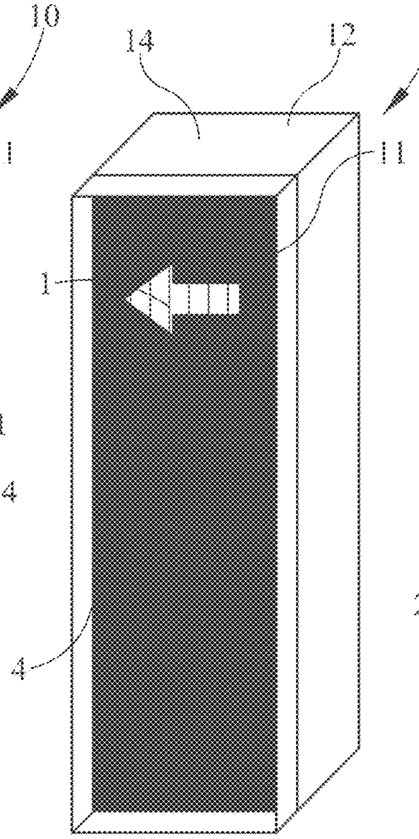
FIG. 4B
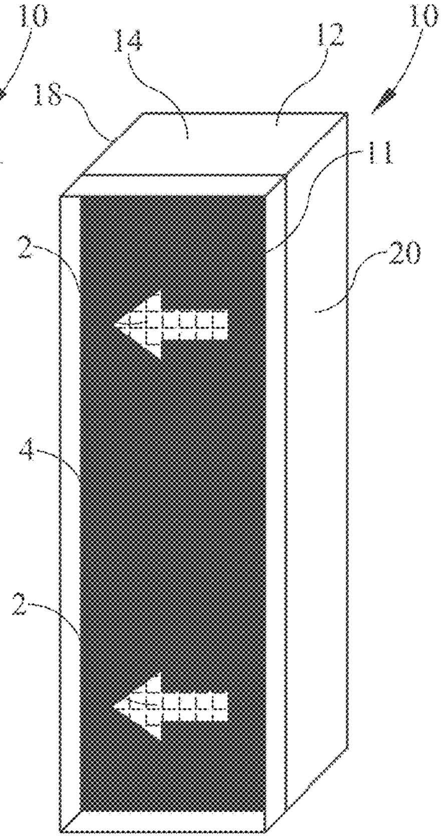
FIG. 4C
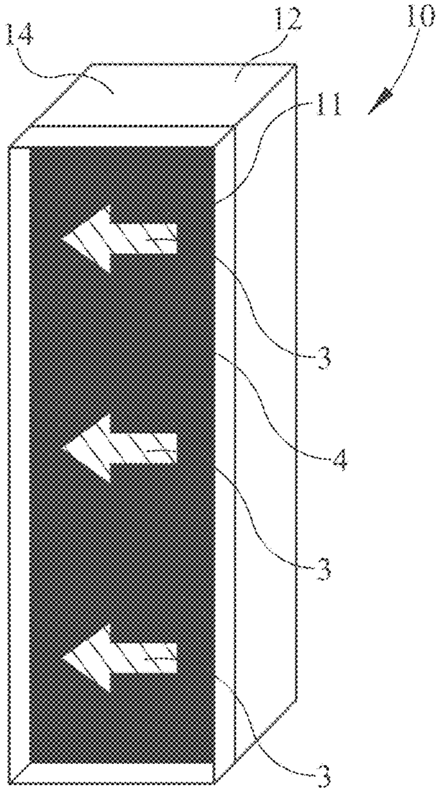
FIG. 4D
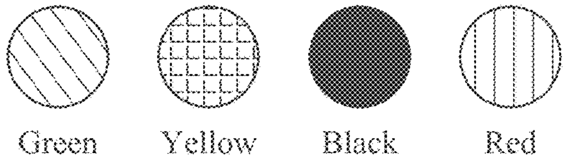

LED TRAFFIC LIGHT SYSTEM

FIELD OF THE INVENTION

The present invention relates to a LED Traffic Light System to aid people who have issues with color blindness. For the main LED traffic light, there is a solid matrix of LEDs on the complete face drivers or pedestrians will see. The light pattern displayed will indicate red, yellow, or green. Auxiliary LED traffic lights can be employed with the main LED traffic light to indicate whether or not turns can be made. These lights, having a larger display than known traffic lights or signals, will also provide enhanced visibility to all viewing.

BACKGROUND OF THE INVENTION

Traffic lights vary around the world. Most generally, they have three lights, typically a green light meaning go, a yellow or amber light meaning caution, and a red light meaning stop. With vertical alignment, from bottom to top, the lights may be green, yellow, and red, or flipped red, yellow, green. With horizontal alignment, from left to right, the lights may be red, yellow, and green or, alternatively, green, yellow, red. At traffic intersections, whether crossing streets, T-junctions, or roundabouts, for example, multiple traffic lights are usually programmed or set to work together to manage traffic flow. For example, when a traffic light facing one direction of travel is green, a traffic light facing another direction of travel is usually red. As the green light changes to yellow caution, and then to red, the light facing the other direction will often stay red as the other light changes from green, to yellow, to red. There may even be a few second period when both lights are red before the light facing the other direction turns from red to green. Depending on the traffic intersections, the green, yellow, and red light cycle times can be varied during the day to adjust for the amount of traffic. Also, lights in one intersection can be synchronized with lights in other intersections to improve traffic flow. In addition to the red, yellow, green traffic light, auxiliary lights can be employed to indicate whether or not turns can be made, and, if so, when.

People who are color blind may or may not be able to tell which of the red, yellow, or green light is on. If they can, they may not be able to determine the color of the light. With the different possible locations or orientations of traffic lights, this can make it difficult for a color blind person to safely travel. The present invention helps a color blind person safely travel.

SUMMARY

The instant invention relates to a LED Traffic Light System to aid people who have issues with color blindness, as, for the main LED traffic light, there is a solid matrix of LEDs on the complete face that drivers or pedestrians approaching will see. This provides the viewer a much larger area to see whether the red, yellow, or green signal is lit. While a red, yellow, or green light pattern is displayed on the LEDs, as is explained herein, a different light pattern is displayed to indicate red, yellow, or green. For red, the entire LED face is illuminated red. For yellow, the entire LED face has two yellow areas illuminated yellow and these two areas are separated by a middle black lit area. For green, the entire LED face has three green areas illuminated green and these three areas are separated by two black lit areas. An alternative to the two black lit areas is also taught.

For the auxiliary LED traffic lights employed with the main LED traffic light used to indicate whether or not turns can be made, different turn area patterns are displayed on another LED face to indicate no turn permitted (red arrow), turn with caution (yellow arrows), or turn permitted (green arrows). An auxiliary light for left turns may be employed to the left of a LED traffic light and an auxiliary light for right turns may be employed to the right of a LED traffic light. Alternatively, auxiliary lights to indicate turns may be located distant from the LED traffic light; for example, at the right side of the road for right turn control. The LED face of the auxiliary turn light will generally have a black colored background. To indicate no turn permitted, a single red colored turn arrow can be illuminated on the black colored background, for example, near the top of the light. To indicate turn permitted with caution, a pair of yellow colored turn arrows can be illuminated on the black colored background, for example, one near the top of the light and one toward the bottom of the light. To indicate turn permitted, three green colored turn arrows can be illuminated on the black colored background, for example, one near the top of the light, one toward the bottom of the light, and one between those two arrows. Symbols other than arrows can be employed. For example, for a red arrow indicating no turn permitted, the red arrow could have a red slanted line crossing it.

More particularly, the present invention is for a LED traffic light system having a first LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for a driver to take from viewing the LED matrix.

Also, a first indication of what action is permitted is to activate all of the LEDs in the LED matrix to display the color red; where a second indication of what action is permitted is to activate LEDs in the upper and lower portions of the LED matrix to display the color yellow, there being an area in the center of the LED matrix where the LEDs are unlit thereby showing a black area between the yellow upper and lower portions; and where a third indication of what action is permitted is to activate LEDs in the upper, middle, and lower portions of the LED matrix to display the color green, there being an area between each of the green upper, middle, and lower portions where the LEDs therein are unlit, that area showing as a black area.

Also, the color red area in the first indication, the color yellow areas in the second indication, and the color green areas in the third indication will preferably each appear with a rectangular shape, and the black area between the yellow areas in the second indication and the black areas between the green areas in the third indication appear with a rectangular shape. Alternatively, the color red area in the first indication, the color yellow areas in the second indication, and the upper and lower color green areas in the third indication may each appear with a rectangular shape and the middle color green area in the third indication appears with a circular shape, and the black area between the yellow areas in the second indication appear with a rectangular shape.

When the LED traffic light is used as an auxiliary light to indicate turn information, a first indication of what action is permitted is to activate LEDs toward the top of the LED matrix to display a single arrow in the color red, the red colored arrow indicating no turn permitted in the direction the arrow points, the remainder of the LEDs in the LED matrix being unlit; a second indication of what action is permitted is to activate LEDs toward the top off the LED matrix to display two arrows in the color yellow, the yellow arrows indicating turn permitted using caution in the direction the arrows point, the remainder of the LEDs in the LED matrix being unlit; and a third indication of what action in permitted is to activate LEDs toward the top, middle, and bottom of the LED matrix to display three arrows in the color green, the green arrows indicating turn permitted in the direction the arrows point, the remainder of the LEDs in the LED matrix being unlit.

Even further, with the LED traffic light, the programmable circuit board connected to a power source can be connected to power external to the housing or to battery back-up power should external power fail.

Also, the LED traffic light system can include a second LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for the driver to take from viewing the LED matrix, where a first indication of what action is permitted displayed on the LED matrix of the second LED traffic light is to activate LEDs toward the top of the LED matrix to display a single arrow in the color red, the red colored arrow indicating no turn permitted in the direction the arrow points, the remainder of the LEDs in the LED matrix being unlit; where a second indication of what action is permitted is to activate LEDs toward the top of the LED matrix to display two arrows in the color yellow, the yellow arrows indicating turn permitted using caution in the direction the arrows point, the remainder of the LEDs in the LED matrix being unlit; and where a third indication of what action is permitted is to activate LEDs toward the top, middle, and bottom of the LED matrix to display three arrows in the color green, the green arrows indicating turn permitted in the direction the arrows point, the remainder of the LEDs in the LED matrix being unlit.

When first and second LED traffic lights are employed, the indication of what action is permitted for the driver to take from viewing the LED matrix displayed on the first LED traffic light and the indication of what action is permitted for a driver to take from viewing the LED matrix displayed on the second LED traffic light are synchronized.

The above summary is from the standpoint of one driver approaching an intersection and the traffic lights that driver might see. In a standard 4-way intersection, there will typically be one or more traffic lights at all the approaches to the intersection. These may all be traffic lights as disclosed herein and those multiple traffic lights will be synchronized to control access to the intersection from the various approaches.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

FIG. 4A depicts the face of an ancillary LED turn light indicating a red no turn allowed arrow.

FIG. 4B depicts the face of an ancillary LED turn light indicating a red no left turn allowed arrow.

FIG. 4C depicts the face of an ancillary LED turn light indicating yellow turn allowed with caution arrows.

DETAILED DESCRIPTION OF THE PREFERRED EMBODIMENTS

Figure 1A:
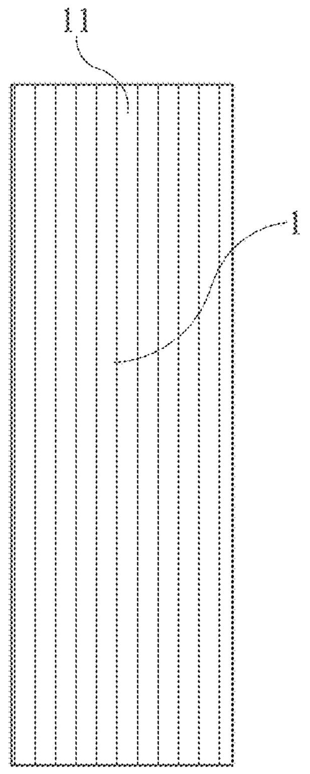
FIG. 1A depicts the face of the main LED traffic light indicating a red light.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

The following numbers are used in the drawings: 1—the color red; 2—the color yellow; 3—the color green; 4—the color black; 10—LED traffic light; 11—LED face; 12—housing; 14—top; 16—bottom; 18—left side; 20—right side; 24—back; 26—fairing; 28—battery back-up access; and 29—circuit board access. In addition to identifying the colors red, yellow, green, and black with the numbers 1, 2, 3, and 4 respectively, the symbols for these colors as detailed in MPEP section 608.02 IX are also used to show the color patterns on the LED face 11.

Again, the present invention relates to a LED Traffic Light System to aid people who have issues with color blindness. For the main LED traffic light 10, there is a solid matrix of LEDs on the complete face 11 facing traffic. The light pattern displayed will indicate red 1/stop, yellow 2/caution, or green 3/go. Black 4 is used to make some of the light patterns displayed unique. Auxiliary LED traffic lights 10 can be employed with the main LED traffic light 10 to indicate whether or not turns can be made.

Figure 1B:
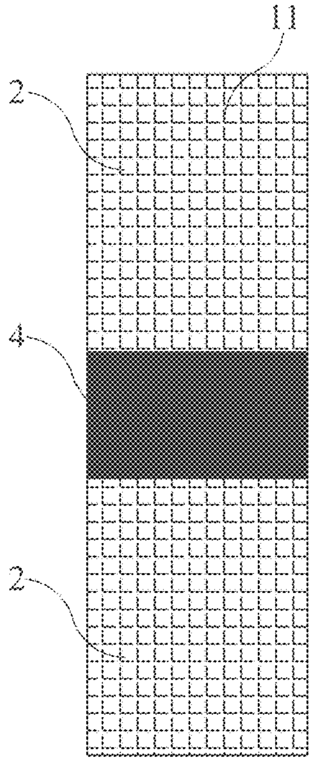
FIG. 1B depicts the face if the main LED traffic light indicating a caution light.
Figure 1C:
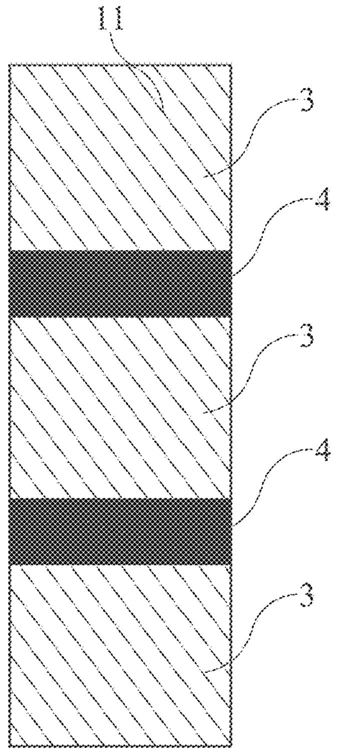
FIG. 1C depicts the face of the main LED traffic light indicating a green light.

With reference to FIGS. 1A, 1B, 1C, and 2, a LED traffic signal 10 is shown with a housing 12 having the shape of a rectangular parallelepiped. FIGS. 1A, 1B, and 1C show the solid LED matrix on the complete front face 11 of the housing 12 which will face traffic. As shown, the edge from top to bottom could have a length of about 42 inches (about 106.7 cm) and the edge from left to right could have a length of about 13.5 inches (about 39.3 cm). Allowing for this larger illuminated area, compared to a regular traffic light, increases the distance that the light can be acquired by a driver and the size of the lit area should help increase safety.

Figure 2:
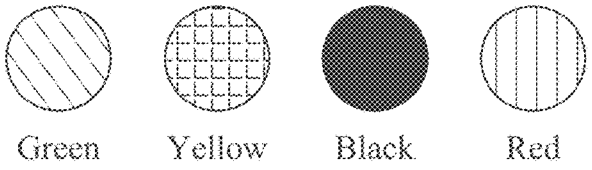
FIG. 2 is a right side view of the main LED traffic light.
Figure 2:
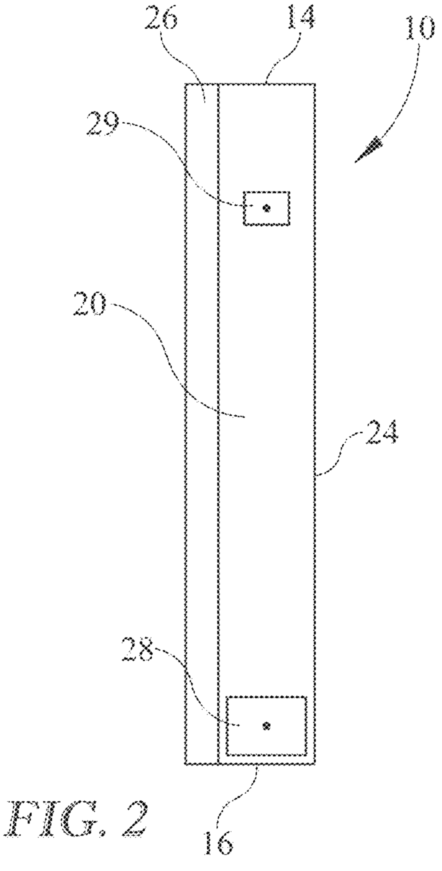

The right side 20 view of FIG. 2 shows housing 12 having a fairing 26 with a depth of about 2 inches (about 5 cm). The fairing 26 provides protection from the elements. FIG. 2 also shows the rest of the housing 12 having a depth of about 6 inches (about 15.25 cm). Also shown is bottom 16 and back 24. Clearly, the LED traffic signal 10 can be made with any desired dimensions.

The LED traffic signal 10 can be powered by external wired power or solar power and, as shown in FIG. 2, have battery backup power, shown with battery back-up access 28. The circuit board possible location is also shown in FIG. 2, identified as circuit board access 29. The circuit board will determine what energy is applied to the various LEDs in the LED matrix, which determines the color(s) displayed on the LED matrix. When a LED is not powered, it appears as black 4.

FIG. 1A shows the LED matrix as it will appear to indicate stop. The entire LED matrix will be lit red 1. FIG. 1B shows the LED matrix as it will appear to indicate caution. There will be a pair of yellow 2 lit areas, each about 17 inches (about 43.2 cm) tall and 13.5 inches wide (about 39.3 cm), with a black 4 unlit area between them of about 8 inches tall (about 20.3 cm) and 13.5 inches wide (about 39.3 cm). FIG. 1C shows the LED matrix as it will appear to indicate go. There will be three green 3 lit areas, each about 11.33 inches (about 28.8 cm) tall and 13.5 inches wide (about 39.3 cm), with a black 4 unlit area between each of the green 3 areas of about 4 inches tall (about 10.2 cm) and 13.5 inches wide (about 39.3 cm). Drivers will see three lit areas for go, two lit areas for caution, and one large lit area for stop. Even if a color blind driver can not determine the colors displayed, the different patterns for go, caution, stop will allow the color blind driver to know what action to take at the traffic signal.

Figure 3:
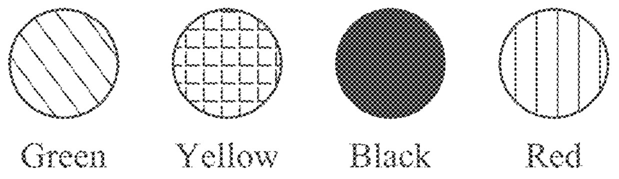
FIG. 3 depicts the face of an alternate main LED traffic light indicating a green light.
Figure 3:
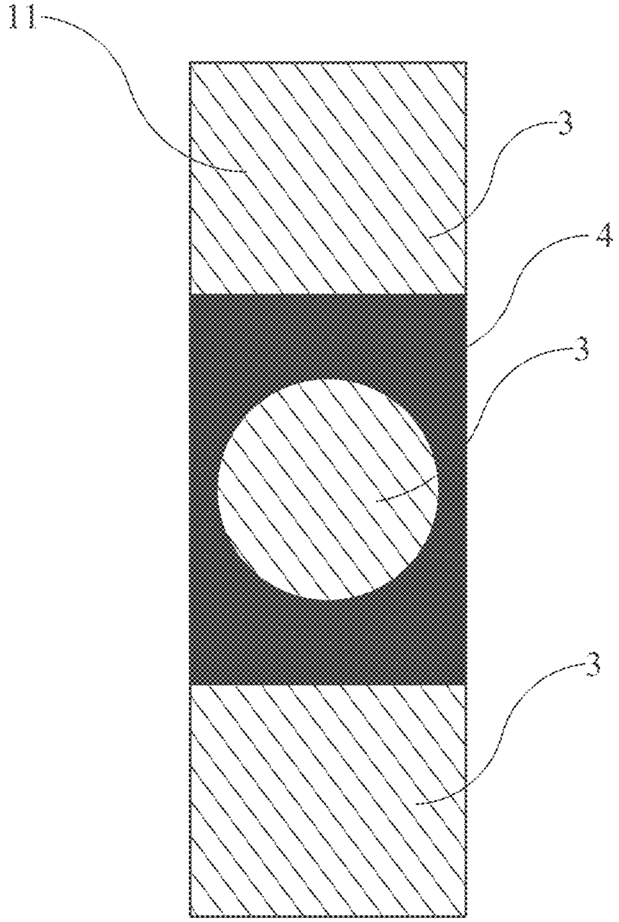

Clearly, the dimensions of the green 3, yellow 2, or red 1 areas and the dimensions of their associated black 4 areas can be changed and still perform the same function. Also, the number of lit areas, 1 for stop, 2 for caution, and 3 for go, can be changed and still perform the same function. Further, different patterns other than rectangles can be shown in the lit or black areas. For example, FIG. 3 shows an alternative display to that shown in FIG. 1C. There, instead of the three green 3 lit areas, each about 11.33 inches (about 28.8 cm) tall and 13.5 inches wide (about 39.3 cm), with a black 4 unlit area between each of the green 3 areas of about 4 inches tall (about 10.2 cm) and 13.5 inches wide (about 39.3 cm) shown in FIG. 1C, the green 3 lit areas at top and bottom remain the same (each about 11.33 inches (about 28.8 cm) tall and 13.5 inches wide (about 39.3 cm), but the center display is changed. The center area of about 19.33 inches (about 49.1 cm) tall and 13.5 inches wide (about 39.3 cm) is black 4 except for a green 3 lit circle at its center, the circle having a diameter of about 10.75 inches (about 27.3 cm).

FIGS. 4A, 4B, 4C, and 4D show the faces 11 of an ancillary LED turn lights 10. Housing 12 is shown with top 14 and left side 18. It is envisioned that the housing 12 for the turn light LED display will have approximately the same dimensions as the housing for the LED traffic light explained above. While an ancillary LED turn light indicator could be placed elsewhere, one may be placed to the left of a LED traffic light to control left turns and another to the right of a LED traffic light to control right turns. Alternatively, a single LED turn light indicator could be used to control both left and right turns.

FIG. 4A shows a turn light indicator for no right turn and FIG. 4B shows a turn light indicator for no left turn. As shown, the entire LED matrix display is unlit (black 4) except for a single red 1 colored arrow toward the top of the display. FIG. 4C shows a turn light indicator for turn left with caution. The entire LED matrix display is unlit (black 4) except for a yellow 2 arrow toward the top of the display and another yellow 2 arrow toward the bottom of the display. FIG. 4D shows a turn indicator indicating that it is permitted to turn left. The entire LED matrix display is unlit (black 4) except for a green 3 arrow toward the top of the display, another green 3 arrow toward the bottom of the display, and a third green 3 arrow toward the center of the display. This turn system uses a single arrow for stop, two arrows for caution, and 3 arrows for go. This corresponds to the 1 rectangle for red, 2 rectangles for yellow, and 3 rectangles for green with the LED traffic light. To provide more emphasis for drivers, any or all of the arrows could flash on and off.

The foregoing detailed description is given primarily for clearness of understanding and no unnecessary limitations are to be understood therefrom for modifications can be made by those skilled in the art upon reading this disclosure and may be made without departing from the spirit of the invention.

The invention claimed is:

1. A LED traffic light system, comprising: a first LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for a driver to take from viewing the LED matrix, where a first indication of what action is permitted displayed on the LED matrix of the first LED traffic light is to activate all of the LEDs in the LED matrix to display the color red; where a second indication of what action is permitted is to activate LEDs in the upper and lower portions of the LED matrix to display the color yellow, there being an area in the center of the LED matrix where the LEDs are unlit thereby showing a black area between the yellow upper and lower portions; and where a third indication of what action is permitted is to activate LEDs in the upper, middle, and lower portions of the LED matrix to display the color green, there being an area between each of the green upper, middle, and lower portions where the LEDs therein are unlit, that area showing as a black area.

2. The LED traffic light system of claim 1, where the color red area in the first indication, the color yellow areas in the second indication, and the color green areas in the third indication each appear with a rectangular shape, and where the black area between the yellow areas in the second indication and the black areas between the green areas in the third indication appear with a rectangular shape.

3. The LED traffic light system of claim 1, where the color red area in the first indication, the color yellow areas in the second indication, and the upper and lower color green areas in the third indication each appear with a rectangular shape and the middle color green area in the third indication appears with a circular shape, and where the black area between the yellow areas in the second indication appear with a rectangular shape.

4. The LED traffic light system of claim 1, where the programmable circuit board connected to a power source can be connected to power external to the housing or to battery back-up power should external power fail.

5. The LED traffic light system of claim 1, further comprising a second LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for the driver to take from viewing the LED matrix, where a first indication of what action is permitted displayed on the LED matrix of the second LED traffic light is to activate LEDs toward the top of the LED matrix to display a single arrow in the color red, the red colored arrow indicating no turn permitted in the direction the arrow points, the remainder of the LEDs in the LED matrix being unlit; where a second indication of what action is permitted is to activate LEDs toward the top of the LED matrix to display two arrows in the color yellow, the yellow arrows indicating turn permitted using caution in the direction the arrows point, the remainder of the LEDs in the LED matrix being unlit; and where a third indication of what action is permitted is to activate LEDs toward the top, middle, and bottom of the LED matrix to display three arrows in the color green, the green arrows indicating turn permitted in the direction the arrows point, the remainder of the LEDs in the LED matrix being unlit.

6. The LED traffic light system of claim 5 where the indication of what action is permitted for the driver to take from viewing the LED matrix displayed on the first LED traffic light and the indication of what action is permitted for the driver to take from viewing the LED matrix displayed on the second LED traffic light are synchronized.

7. A LED traffic light system, comprising: a first LED traffic light having a housing, the housing having a LED matrix covering the full face of the housing; a programmable circuit board connected to a power source and to each of the LEDs contained in the LED matrix, the programmable circuit board programmed such that it can individually activate each of the LEDs in the LED matrix to display at least one indication of what action is permitted for a driver to take from viewing the LED matrix, where a first indication of what action is permitted is to activate LEDs toward the top of the LED matrix to display a single arrow in the color red, the red colored arrow indicating no turn permitted in the direction the arrow points, the remainder of the LEDs in the LED matrix being unlit; where a second indication of what action is permitted is to activate LEDs toward the top of the LED matrix to display two arrows in the color yellow, the yellow arrows indicating turn permitted using caution in the direction the arrows point, the remainder of the LEDs in the LED matrix being unlit; and where a third indication of what action is permitted is to activate LEDs toward the top, middle, and bottom of the LED matrix to display three arrows in the color green, the green arrows indicating turn permitted in the direction the arrows point, the remainder of the LEDs in the LED matrix being unlit.

* * * * *